(12) United States Patent
Li et al.

(10) Patent No.: US 10,199,615 B2
(45) Date of Patent: Feb. 5, 2019

(54) TOP COVER STRUCTURE OF POWER BATTERY AND POWER BATTERY

(71) Applicant: Contemporary Amperex Technology Co., Limited, Ningde (CN)

(72) Inventors: Quankun Li, Ningde (CN); Pinghua Deng, Ningde (CN); Peng Wang, Ningde (CN); Kai Wu, Nindge (CN); Junjie Jiang, Ningde (CN)

(73) Assignee: Contemporary Amperex Technology Co., Limited, Ningde, Fujian Province (CN)

( * ) Notice: Subject to any disclaimer, the term of this patent is extended or adjusted under 35 U.S.C. 154(b) by 291 days.

(21) Appl. No.: 15/179,921

(22) Filed: Jun. 10, 2016

(65) Prior Publication Data

US 2016/0365547 A1    Dec. 15, 2016

(30) Foreign Application Priority Data

Jun. 11, 2015    (CN) .................... 2015 2 0401861 U

(51) Int. Cl.
*H01M 2/00*    (2006.01)
*H01M 2/04*    (2006.01)
(Continued)

(52) U.S. Cl.
CPC ......... *H01M 2/0486* (2013.01); *H01M 2/043* (2013.01); *H01M 2/0443* (2013.01);
(Continued)

(58) Field of Classification Search
CPC ............. H01M 2/345; H01M 2200/20; H01M 2/0443; H01M 2/043; H01M 2/0456
See application file for complete search history.

(56) References Cited

U.S. PATENT DOCUMENTS

2011/0052949 A1    3/2011    Byun et al.
2012/0183818 A1    7/2012    Byun et al.
(Continued)

FOREIGN PATENT DOCUMENTS

JP    3189700 U    7/2001
JP    2011-054561 A    3/2011
(Continued)

OTHER PUBLICATIONS

From EP Application No. 16173463.7, Office Action dated Oct. 31, 2017.
(Continued)

*Primary Examiner* — Cynthia H Kelly
*Assistant Examiner* — Monique M Wills
(74) *Attorney, Agent, or Firm* — Ladas & Parry, LLP

(57) ABSTRACT

The top cover structure of the power battery includes a cap plate, a cathode column, a conducting piece and a reversing piece, the conducting piece is electrically connected with the cathode column, the cathode column is insulatedly assembled with the cap plate; the reversing piece includes a welding part, a embossment with a solid core structure and a joint part arranged between the welding part and the embossment, the embossment is arranged at the center of the joint part, the welding part is arranged on the outer margin of the joint part; the welding part is electrically connected with the cap plate, the embossment does not contact the conducting piece, when the pressure inside the power battery increases, the reversing piece receives the pressure inside the power battery, and moves upwards, so that the embossment is electrically connected to the conducting piece.

17 Claims, 7 Drawing Sheets

(51) Int. Cl.
*H01M 2/34* (2006.01)
*H01M 2/06* (2006.01)

(52) U.S. Cl.
CPC ........... *H01M 2/0456* (2013.01); *H01M 2/06* (2013.01); *H01M 2/345* (2013.01); *H01M 2200/20* (2013.01); *H01M 2220/20* (2013.01)

(56) References Cited

U.S. PATENT DOCUMENTS

| | | | |
|---|---|---|---|
| 2012/0237802 A1 | 9/2012 | Byun et al. | |
| 2013/0130072 A1 | 5/2013 | Guen et al. | |
| 2015/0147600 A1* | 5/2015 | Tsuruta | H01M 2/345 429/7 |
| 2016/0190657 A1* | 6/2016 | Hirose | H01M 2/06 429/7 |

FOREIGN PATENT DOCUMENTS

| | | |
|---|---|---|
| JP | 2011-124214 A | 6/2011 |
| JP | 2011-154992 A | 8/2011 |
| JP | 2011-258561 A | 12/2011 |
| JP | 2012-174683 A | 9/2012 |
| JP | 2012-195278 A | 10/2012 |
| JP | 2012-212645 A | 11/2012 |
| JP | 2014-082073 A | 5/2014 |

OTHER PUBLICATIONS

From JP Application No. 2016-104445, Office Action dated Dec. 5, 2017 with English translation from Global Dossier.
Extended European Search Report for EP 16173463 dated Jul. 29, 2016.
Office Action for JP2016-104445 dated Jun. 6, 2017.

\* cited by examiner

TOP COVER STRUCTURE OF POWER BATTERY AND POWER BATTERY

CROSS-REFERENCE TO RELATED APPLICATION

This application claims the priority to and the benefit of Chinese Patent Application No. 201520401861.0 filed on Jun. 11, 2015, the disclosure of which is incorporated herein by reference in its entirety.

TECHNICAL FIELD

The present invention belongs to the field of power battery technologies, particularly refers to a top cover structure of a power battery and a power battery.

BACKGROUND

Electric vehicle and an energy storage power station generally need a power battery with large capacity as the power supply. Except for the large capacity, the power battery should also possess good security and longer cycle lifetime etc., so that to achieve the using standard and meet people's requirements.

In prior art, when the power battery is overcharged, the decomposition of the electrolyte in the power battery will result in that excess heat is generated inside the power battery which may cause fire; or will increase the pressure inside the power battery and lead to explosion. Therefore, before the power battery out of control, an outer short circuit structure is needed to cut the Fuse structure in the main circuit of the power battery, so as to stop the power battery from being charged. For example, when the power battery overcharged, and a certain pressure is generated inside the power battery, the outer short circuit structure works, the power battery itself forms a circuit, so as to fuse the Fuse, and thus the main circuit is cut. The outer short circuit structure works in a certain pressure, its over-current capacity is larger than the Fuse's, which cannot be fused before the Fuse in a high current. FIG. 1 is a structural schematic diagram of a part of the top cover of the power battery in prior art. As shown in FIG. 1, in prior art, a reversing piece 1 is adopted to achieve the function of the outer short circuit structure, the reversing piece 1 adopts a circular disk with uniform thickness, a raised hollow top surface is provided at the center of the circular disk. The reversing piece 1 and the cathode column 2 on the top cover of the power battery are disconnected and insulated when in normal use. When the power battery is overcharged and generates a certain pressure, the pressure will push the reversing piece 1 to move, so that the raised top surface of the reversing piece 1 is connected to a conducting piece 3, the conducting piece 3 is electrically connected with the cathode column 2, so as to form a circuit loop in the power battery, then the Fuse is fused, the main circuit is cut off, which protects the power battery.

However, when the power battery is overcharged and generates a certain pressure, after the pressure pushing the reversing piece 1 to move, the raised top surface of the reversing piece 1 contacts the conducting piece 3, the raised portion is of a hollow structure, the over-current area is small, a high current is generated at the position where the raised portion of the reversing piece 1 contacts the conducting piece 3, when the current is high enough to a certain degree, the reversing piece 1 may be fused, which leads to fire or explosion of the power battery.

SUMMARY

The present invention provides a top cover structure of a power battery and a power battery, which is used to solve the defects in the prior art that the over-current area of the inner ring is small caused by the uniform thickness of the inner wall of the reversing piece, the reversing piece is easy to be fused when a high current passes, which leads to that the reversing piece has no effect, causing fire or explosion of the power battery.

The present invention provides a top cover structure of a power battery, including a cap plate, a cathode column, a conducting piece and a reversing piece, the conducting piece is electrically connected with the cathode column, the cathode column and the cap plate are insulatedly assembled; the reversing piece includes a welding part, an embossment of a solid core structure and a joint part arranged between the welding part and the embossment, the embossment is arranged at the center of the joint part, the welding part is arranged at the outer margin of the joint part; the welding part is electrically connected with the cap plate, the embossment does not contact the conducting piece, when the pressure inside the power battery increases, the reversing piece receives the pressure inside the power battery, and moves upward, so that the embossment is electrically connected to the conducting piece.

Further, in the above top cover structure of the battery, the thickness of the joint part decreases gradually in the direction from inside to outside.

Further, in the above structure of the top cover of the power battery, thickness of the embossment is larger than that of the joint part.

Further, an upper surface of the embossment is a cambered surface.

Further, an upper surface of the embossment is a spherical surface or an arch surface structure.

Further, an upper surface of the embossment extends to the joint part.

Further, an upper surface of the embossment is a flat surface.

Further, in the above structure of the top cover of the power battery, the embossment is of a cylinder structure.

Further, a reversing piece connection hole is provided on the cap plate, the conducting piece extends to the above of the reversing piece connection hole, the reversing piece is arranged in the reversing piece connection hole, the welding part is sealed and welded with an inner wall of the reversing piece connection hole.

Further, a circle of recess is provided at edge of an end of the reversing piece connection hole, the welding part is arranged in the recess, and is welded with a side wall of the recess.

Further, the recess is provided at a bottom end of the reversing piece connection hole.

Further, the welding part is parallel and level to a lower surface of the cap plate.

Further, the recess is provided at a top end of the reversing piece connection hole.

Further, the welding part is parallel and level to an upper surface of the cap plate.

Further, the upper surface and the lower surface of the welding part are both flat surfaces.

Further, in the above structure of the top cover of the power battery, the welding part, the embossment and the joint part of the reversing piece are integrated as a whole structure.

The present invention also provides a power battery, the top cover structure of the power battery adopts the top cover structure of the power battery as mentioned above.

The top cover structure of the power battery according to the present invention, through arranging the embossment of a solid core structure, can effectively increase the over-current area of the surface the embossment contacting the conducting piece, and reduce the over current, and decrease the rate of fusing of the reversing piece, so as to effectively reduce the risk of fire and explosion of the power battery, and significantly improve the safety performance of the power battery.

BRIEF DESCRIPTION OF DRAWINGS

In order to explain the technical solutions in embodiments of the present invention or in the prior art clearly, a brief introduction of the drawings used in the embodiments or the prior art will be provided here, obviously, the drawings described below are some embodiments of the present invention, those skilled in the art can also obtain other drawings according to these drawings without creative work.

DESCRIPTION OF EMBODIMENTS

In order to make the objects, technical solutions and advantages of the embodiments of the present invention more clearly, the technical solutions of the present invention will be described clearly and completely combing the top cover structures of the power battery in the prior art and the drawings in the embodiments of the present invention, obviously, the described embodiments are only part of the embodiments of the present invention, but not all of them, other embodiments obtained by those skilled in the art without creative work are all belonging to the protection scope of the present invention.

Figure 1:
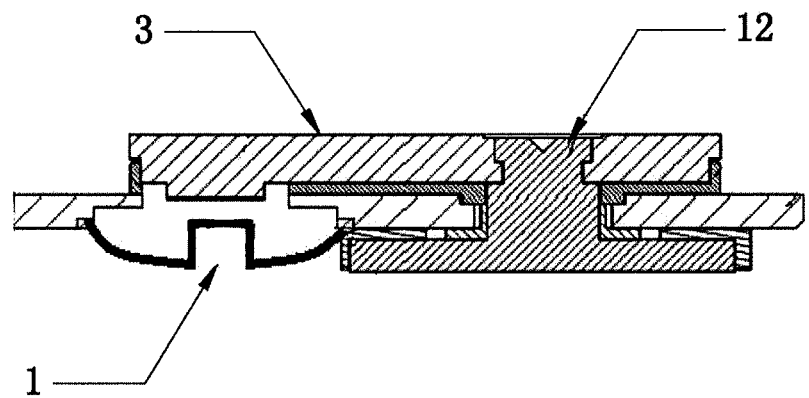
FIG. 1 is a structural schematic diagram of part of the top cover of the existing power battery.

Adopting the top cover structure of the power battery shown in FIG. 1, when a certain pressure is generated inside the power battery, the reversing piece 1 is electrically connected to the conducting piece 3, and the conducting piece 3 is electrically connected with the cathode column 2 of the power battery, so as to form a circuit loop by the power battery itself, if the circuit loop resistance is controlled within 4 mohm, circuit current I=voltage of power battery (4-5V)/circuit loop resistance (0.8-4 mohm), the circuit loop current can reach 1000-6400 A, that means, the circuit loop current is quite large. Thus, when the overcharging current of the power battery normally is 1 C, the current is able to reach above 3 C in regular work, so that the Fuse of which the over-current is just 1 C should not be arranged in the main circuit loop. The common Fuses of the power battery are all required to bear a continuous over-current above 10 C. For example, the Fuse of the power battery of 30 Ah needs to bear a continuous over-current of 300 A, however, if it is needed to bear a continuous over-current, the fusing circuit is at least above 600 A. Thus the top cover structure of the power battery can fuse the Fuse immediately, and cut the main circuit loop, so as to protect the power battery.

The power battery is generally of a narrow-long structure, which will not be too thick, or limits the side of the reversing piece 1, in order to guarantee that the reversing piece 1 can move under a certain pressure (moving upward shown as FIG. 1), the moving area of the reversing piece 1 needs to be laminated, usually is around 0.1-0.3 mm. In order to guarantee that the over-current capacity of the reversing piece 1 is better than the Fuse's, the area of the position where the reversing piece 1, after moving, contacts the conducting piece 3 is large and the annular section area of the non-contact position is large either. A large resistance exists at the moment that the reversing piece 1, after moving upward, contacts the conducting piece 3, thus, even though the over-current area of the reversing piece 1 is equal to the over-current area of the Fuse, the reversing piece 1 will be fused earlier when large current passes, causing fire of the battery core. Therefore, the over-current area of the reversing piece 1 is at least larger than 1.2 times of the over-current area of the Fuse, only then the power battery can get effective protection. When the power battery is in regular work, the temperature of the battery core in normal use cannot be too high, the Fuse of single battery core needs to be fused after the Fuse of the whole power battery module in the same current, thus the over-current area of the Fuse cannot be too small. For example, at 30 Ah the over-current area of the Fuse is at least above 3.5 mm2, so the over-current area of the reversing piece 1 is at least above 4.2 mm2. The sectional area of each position of the circular reversing piece 1=3.14*diameter D*thickness T of the section. If the reversing piece 1 is made to be with uniform wall thickness, in order to guarantee that the reversing piece 1 can move upward in a certain pressure, the wall thickness of the reversing piece is around 0.1-0.3 mm, thus the sectional area of the inner-circle of the reversing piece 1 is small, such as the section area of the over-current position=3.14*4*0.3≈3.77 mm2, thus when the current is large, the reversing piece 1 will be fused before the Fuse, causing fire or explosion of the battery.

In order to solve the above-mentioned problem the present invention provides a technical solution to guarantee that the reversing piece 1 won't be fused before the Fuse, which guarantees security of the battery. The details of the technical solution of the embodiments of the present invention are as followings.

Figure 2:
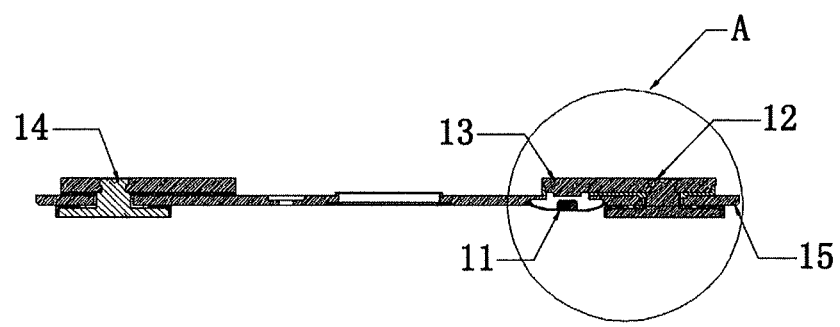
FIG. 2 is a structural schematic diagram of the top cover structure of the battery according to an embodiment of the present invention.
Figure 3:
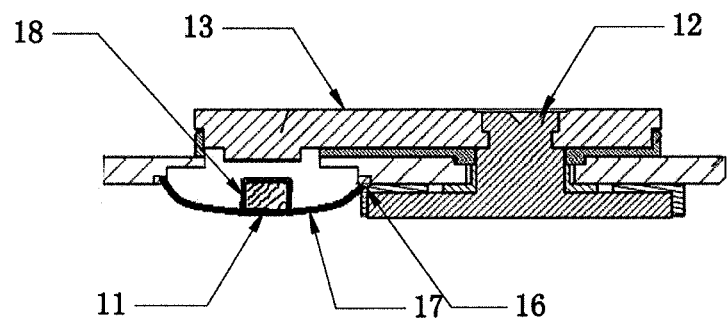
FIG. 3 is an enlarged schematic diagram of area A in FIG. 2.

FIG. 2 is a structural schematic diagram of a top cover structure of the power battery according to an embodiment of the present invention. FIG. 3 is an enlarged schematic diagram of area A in FIG. 2. As shown in FIG. 2 and FIG. 3, the present invention includes a reversing piece 11, a cathode column 12 and a conducting piece 13, an anode column 14 and a cap plate. The anode column 14 is electrically connected with the cap plate 15, the cathode column 12 is insulatedly assembled with the cap plate 15, the cathode column 12 is electrically connected with the conducting piece 13, the reversing piece 11 specifically includes a welding part 16, a embossment 18 of a solid core structure and a joint part 17 between the welding part 16 and the embossment 18, the embossment 18 is arranged in the central of the joint part 17, the welding part 16 is arranged at the outer margin of the joint part 17; the reversing piece 11 is close to but does not contact the conducting piece 13, and when the pressure inside the power battery is increasing, the reversing piece 11 receives the pressure inside the power battery, and moves upward, so that the embossment 18 is electrically connected to the conducting piece 13.

When a certain pressure is generated inside the power battery, the reversing piece 11 moves upward under the effect of the pressure, until the embossment 18 is electrically connected to the conducting piece 13, so that a circuit is formed between the anode column 14 and the cathode column 12 of the power battery, a large short current passes, which leads to fuse of the Fuse in the main circuit loop, and cut the main circuit loop, so as to protect the power battery. Because the position where the embossment 18 is connected to the conducting piece 13 is the neck area of the over-current, therefore, the circuit at the moment that the embossment 18 contacts the conducting piece 13 is quite large, which is easy to cause part of the contact position be fused.

In the embodiment, the embossment 18 is made to be a solid core structure. The sectional area of each circle of the reversing piece 11 that the current passes=3.14*diameter D*thickness T, comparing with the reversing piece with uniform thickness in the prior art, through adding the thickness T, the over-current area that the embossment 18 of solid core structure contacts the conducting piece 13 is enlarged, so as to guarantee that the embossment 18 will not be fused first in a large current.

Figure 7A:
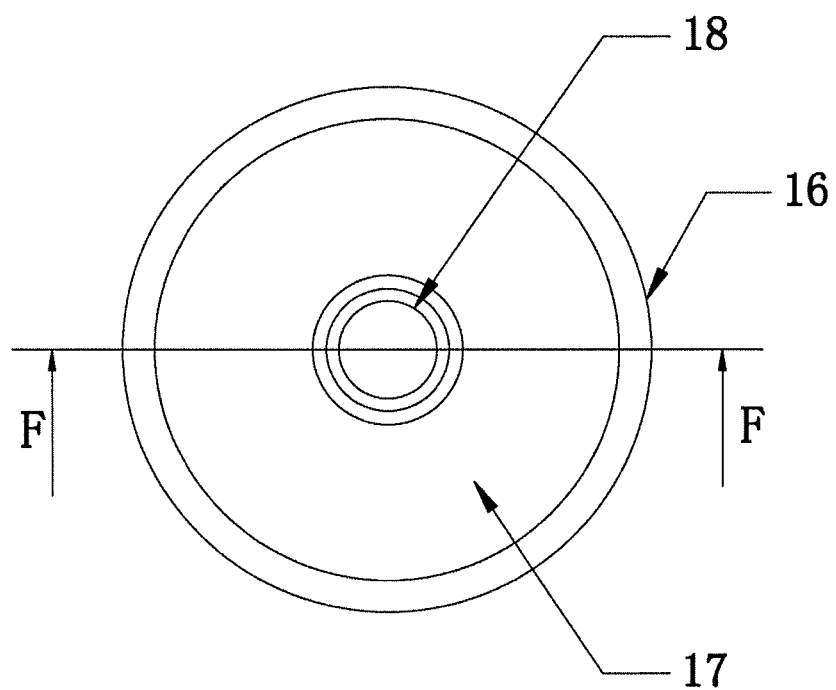
FIG. 7A is a top view of a reversing piece of the top cover structure of the power battery according to the present invention.
Figure 7B:
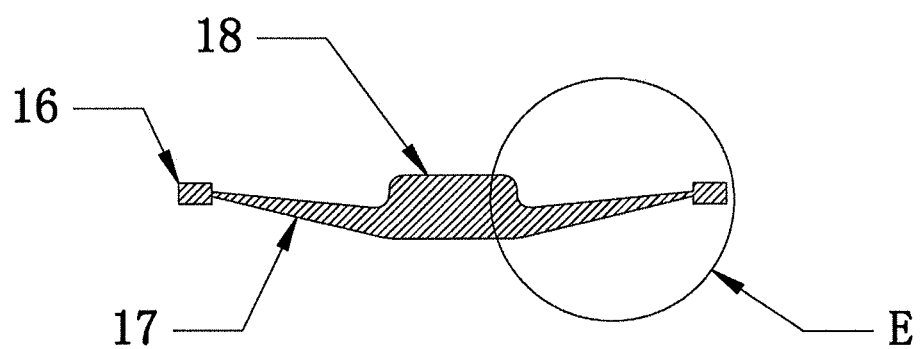
FIG. 7B is a cross-sectional view of a reversing piece with a flat upper surface of the embossment in FIG. 7A along F-F direction.
Figure 7C:
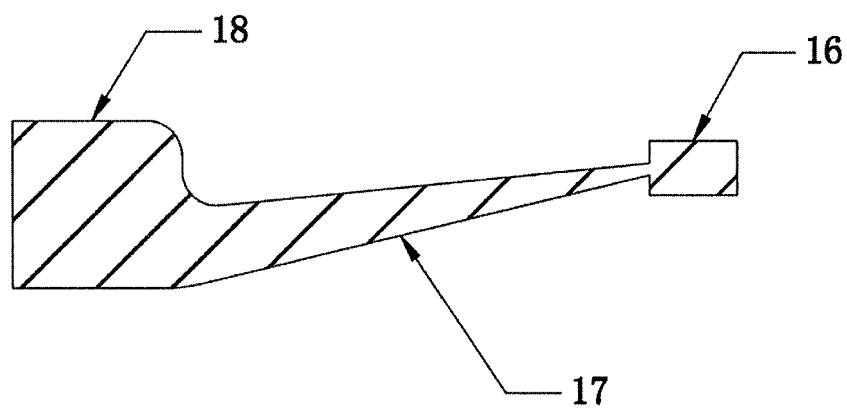
FIG. 7C is an enlarged schematic diagram of area E in FIG. 7B.
Figure 7D:
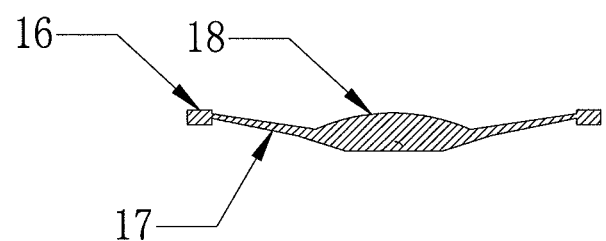
FIG. 7D is a cross-sectional view of a reversing piece with a cambered upper surface of the embossment in FIG. 7A along F-F direction.

As shown in FIG. 7D, in the present embodiment, an upper surface of the embossment 18 can be a cambered surface, such as spherical surface or arch surface structure, moreover, the upper surface of the embossment 18 can extend peripherally to the joint part 17. In order to obtain larger over-current area, the upper surface of the embossment 18 is preferably a flat surface, for example, the embossment 18 of the embodiment can be cylinder, or podetium with polygon section (such as square, pentagon or hexagon and so on); but when the inner diameter is the same, the perimeter of circle is the longest, when the thickness of the embossment 18 is the same, the over-current area of the cylinder is the largest, therefore, the embossment 18 of the embodiment is most preferably cylinder.

In the embodiment, arranging of the embossment 18 of solid core structure can effectively increase the over-current area that the embossment 18 contacts the conducting piece 13, and reduce the over current, and decrease the rate of the reversing piece 11 being fused, so as to lower the risk of fire and explosion of the power battery effectively, and significantly improve the safety performance of the power battery.

The top cover structure of the power battery of the embodiment shown in the above FIG. 2 and FIG. 3, the embossment 18 is solid, but there is no limit to the joint part 17 of the reversing piece 11, the joint part 17 may be still a piece with uniform thickness. Thus when the pressure inside the power battery increases, after the pressure pushes the reversing piece 11 to move, and the reversing piece 11 is electrically connected to the conducting piece 13, the current will scatter outward loop by loop. When the current scatters to the joint part 17, the over-current area cannot be smaller than that of the embossment 18, otherwise the joint part 17 will be fused immediately. According to the sectional area of each circle of the reversing piece lithe that the circuit passes=3.14*diameter D*thickness T, when the thickness of the joint part 17 is thin, the over-current area of the joint part 17 of the reversing piece 11 that the current passes may be less than the over-current area of the embossment 18 that the current passes, which leads to that the joint part 17 is fused immediately.

In order to solve the above problem, the present invention also provides the following technical solution in the embodiment.

Figure 4:
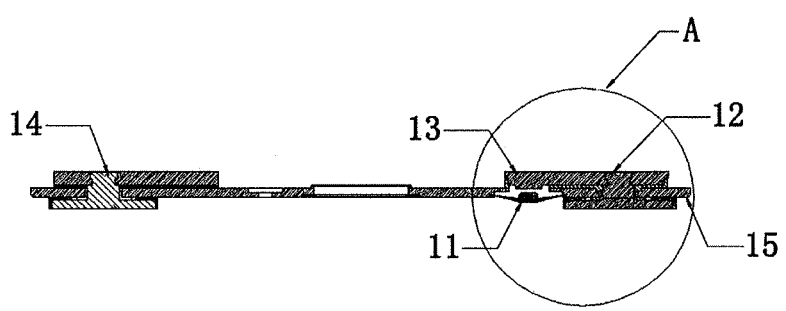
FIG. 4 is a structural schematic diagram of the top cover structure of the power battery according to another embodiment of the present invention.
Figure 5:
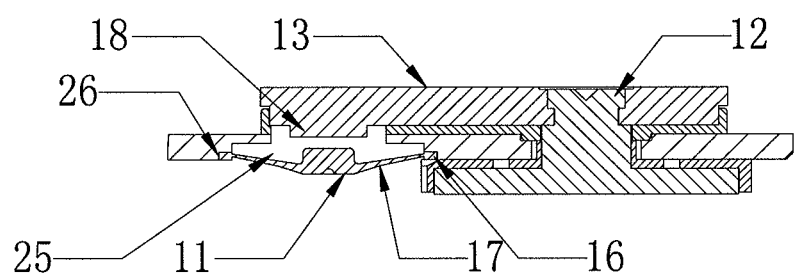
FIG. 5 is an enlarged schematic diagram of area A in FIG. 4 when a recess is provided at a bottom end of a cap plate connection hole.

FIG. 4 is a structural schematic diagram of the top cover structure of the power battery according to another embodiment of the present invention. FIG. 5 is an enlarged schematic diagram of area A in FIG. 4, as shown in FIG. 4 and FIG. 5, based on the technical solution of the embodiment shown in the above FIG. 2 and FIG. 3, in the present embodiment, the thickness of the joint part 17 of the reversing piece 11 gradually reduces from inside to outside. FIG. 7A is a top view of the reversing piece 11 of the top cover structure of the power battery provided by the embodiment of the present invention; FIG. 7B is the sectional view of FIG. 7A in F-F direction; FIG. 7C is an enlarged schematic diagram of the area E in FIG. 7B. As shown in FIG. 7A, the top view of the reversing piece 11 of the embodiment can be of a disk shape. The annular shape of the outer margin is the welding part 16; the embossment 18 is located in the center of the disk; the joint part 17 is located between the welding part 16 and the embossment 18. As shown in FIG. 7B and FIG. 7C, the direction of the joint part 17 of the reversing piece 11 of the embodiment is along a direction from the embossment 18 to the welding part 16, that is, the direction from inside to outside, the thickness increases gradually. And as shown in FIG. 7A, FIG. 7B, FIG. 7C and FIG. 7D, thickness of the embossment 18 is larger than that of the joint part 17.

As shown in FIG. 4, FIG. 5, FIG. 6, FIG. 7A, FIG. 7B, FIG. 7C and FIG. 7D, the thickness of the joint part 17 is becoming thinner and thinner from the inside to the outside, according to the above formula of the sectional area of each circular of the reversing piece 11 that the current passes, since the inner ring is thick, the joint part 17 can reduce the influence brought by the small diameter of the inner ring; when the over-current is diffusing to the outer ring, although the thickness of the outer ring is becoming thinner, the diameter D of the outer ring is enlarged, the impact brought by the over-current can be beard, so as to avoid the joint part 17 from being fused directly. Thus, the sectional area of the whole joint part 17 can meet the requirement of the over-current from the inside to the outside, at the same time, because the outer ring wall of the joint part 17 of the reversing piece 11 is thin, the reversing piece 11 can be moved upward in a certain pressure.

In the present embodiment, designing of the joint part 17 to be of a various section structure not only guarantees that the reversing piece 11 can meet the pressure requirement when moving, but also increases the over-current area of the inner ring of the joint part 17 effectively, reduces the over current, decreases the rate of fusing the reversing piece 11, so as to reduce the risk of fire and explosion of the power battery, and further increases the safety performance of the power battery.

In the present embodiment, a reversing piece connection hole 25 is provided on the cap plate 15, the conducting piece 13 extends to the above of the reversing piece connection hole 25, the reversing piece 1 is arranged in the reversing piece connection hole 25, the welding part 16 is sealed and welded with an inner wall of the reversing piece connection hole. Specifically, a circle of recess 26 can be provided at edge of an end of the reversing piece connection hole 25, the welding part 16 is arranged in the recess 26, and is welded with a side wall of the recess 26. The recess 26 can be provided at a bottom end of the reversing piece connection hole 25 (refer to FIG. 5), and can also be provided at a top end of the reversing piece connection hole 25 (refer to FIG. 6). No matter provided at the top end or the bottom end, it is preferred that the welding part 16 is parallel and level to a surface of the cap plate 15, that is, when the recess 26 is provided at the top end of the reversing piece connection hole 25, the welding part 16 is parallel and level to an upper surface of the cap plate 15, when the recess 26 is provided at the bottom end of the reversing piece connection hole 25, the welding part 16 is parallel and level to a lower surface of the cap plate 15, so as to facilitate welding. In order to facilitate the reversing piece 1 to be installed at different positions of the reversing piece connection hole 25, the upper surface and lower surface of the welding part 16 can be flat surfaces, so as to be parallel and level with the surface corresponding to the cap plate 15.

The reversing piece 11 of the top cover structure of the power battery of the above embodiment, in order for convenient production, the welding part 16, the joint part 17 and the embossment 18 can be integrated as a whole.

Figure 8:
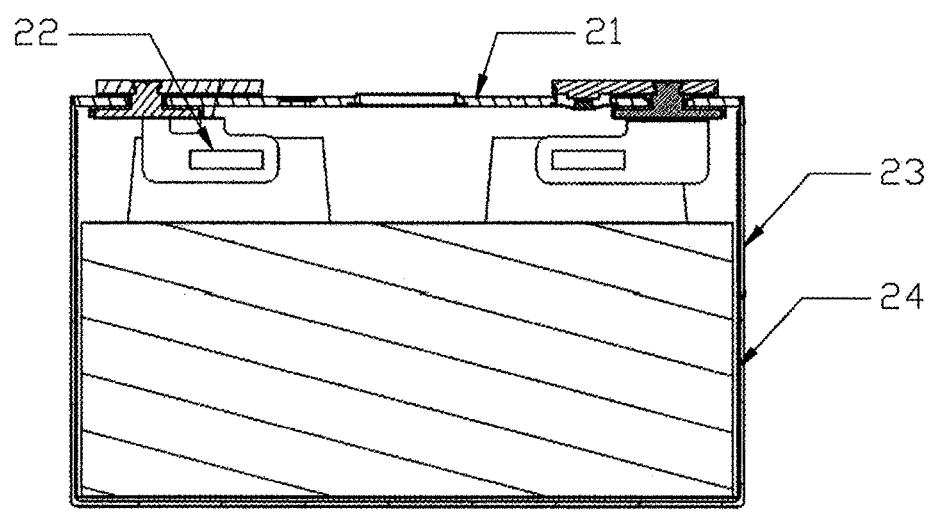
FIG. 8 is a structural schematic diagram of the power battery according to the present invention.

FIG. 8 is a structural schematic diagram of the power battery according to the present invention. As shown in FIG. 8, the power battery of the present embodiment includes a top cover structure 21 of a power battery, a battery case 22, Fuse 23 and an insulating sheet 24 and so on. The top cover structure of the power battery can adopt the top cover structure of the power battery shown in the above FIG. 2 and FIG. 3, which can effectively increase the over-current area of the surface the embossment 18 contacting the conducting piece 13, and reduce the over current, and decrease the rate of fusing the reversing piece 11, so as to reduce the risk of fire and explosion of the power battery effectively, and significantly increase the safety performance of the power battery.

Figure 6:
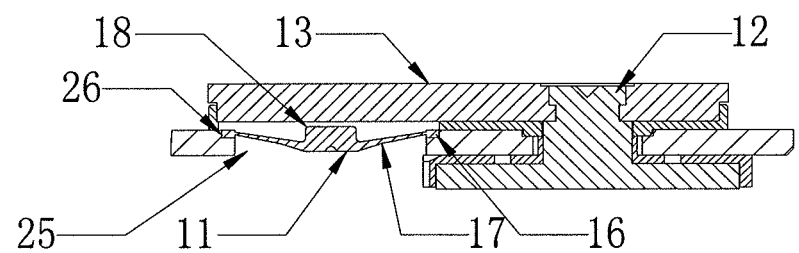
FIG. 6 is an enlarged schematic diagram of area A in FIG. 4 when a recess is provided at a top end of a cap plate connection hole.

The top cover structure of the power battery of the present embodiment can adopt the top cover structure of the power battery shown in the above FIGS. 4-6. As shown in FIG. 8, the technical solution of the present embodiment is described by taking the top cover structure of the power battery shown in FIGS. 4-6 as an example. It should be noted that the power battery of the present embodiment can also include other parts, the relevant prior art can be referred for details, which will not be repeated here.

The power battery of the present embodiment adopts the top cover structure of the power battery of the above embodiments, increases the over-current area of the reversing piece 11 effectively, reduce the over current, and decrease the rate of fusing the reversing piece 11, so as to reduce the risk of fire and explosion of the power battery, significantly improve the safety performance of the power.

Finally, it should be noted that: the above embodiment is just used to explain the technical solutions of the present invention, rather than limiting; although the present invention is explained in detail referring to the above-mentioned embodiments, those skilled in this art should understand: the above-mentioned technical solution of each embodiment can be modified, or any equivalent variations can be made to part of the technical features; however, these modifications or variations will not let the essence of corresponding technical solutions depart from the spirit and scope of the technical solution of each embodiment of the present invention.

What is claimed is:

1. A top cover structure of a power battery, comprising a cap plate, an anode column, a cathode column, a conducting piece and a reversing piece, wherein the anode column is electrically connected with the cap plate, the conducting piece is electrically connected with the cathode column, the cathode column is insulatedly assembled with the cap plate, wherein the reversing piece comprises a welding part, an embossment of a solid core structure and a joint part arranged between the welding part and the embossment, the embossment is arranged at the center of the reversing piece, the welding part is arranged at the outer margin of the joint part; the welding part is electrically connected with the cap plate, the embossment does not contact with the conducting piece, and when pressure inside the power battery increases, the reversing piece receives the pressure inside the power battery, and moves upward, so that the embossment is electrically connected to the conducting piece and a circuit is formed between the anode column and the cathode column.

2. The top cover structure of the power battery according to claim 1, wherein thickness of the joint part gradually decreases in a direction from inside to outside.

3. The top cover structure of the power battery according to claim 2, wherein thickness of the embossment is larger than that of the joint part.

4. The top cover structure of the power battery according to claim 1, wherein an upper surface of the embossment is a cambered surface.

5. The top cover structure of the power battery according to claim 4, wherein the upper surface of the embossment is a spherical surface or an arch surface structure.

6. The top cover structure of the power battery according to claim 5, wherein the upper surface of the embossment extends to the joint part.

7. The top cover structure of the power battery according to claim 1, wherein an upper surface of the embossment is a flat surface.

8. The top cover structure of the power battery according to claim 7, wherein the embossment is of a cylinder structure.

9. The top cover structure of the power battery according to claim 1, wherein a reversing piece connection hole is provided on the cap plate, the conducting piece extends to above the reversing piece connection hole, the reversing piece is arranged in the reversing piece connection hole, the welding part is sealed and welded with an inner wall of the reversing piece connection hole.

10. The top cover structure of the power battery according to claim 9, wherein a circle of recess is provided at edge of an end of the reversing piece connection hole, the welding part is arranged in the recess, and is welded with a side wall of the recess.

11. The top cover structure of the power battery according to claim 10, wherein the recess is provided at a bottom end of the reversing piece connection hole.

12. The top cover structure of the power battery according to claim 11, wherein the welding part is parallel and level to a lower surface of the cap plate.

13. The top cover structure of the power battery according to claim 10, wherein the recess is provided at a top end of the reversing piece connection hole.

14. The top cover structure of the power battery according to claim 13, wherein the welding part is parallel and level to an upper surface of the cap plate.

15. The top cover structure of the power battery according to claim 12, wherein the upper surface and the lower surface of the welding part are both flat surfaces.

16. The top cover structure of the power battery according to claim 1, wherein the welding part, the joint part and the embossment are integrated as a whole structure.

17. A power battery, comprising the top cover structure of the power battery according to claim 1.

* * * * *